US006557725B2

(12) United States Patent
Tomioka

(10) Patent No.: US 6,557,725 B2
(45) Date of Patent: May 6, 2003

(54) ARTICLE DISCHARGING DEVICE

(75) Inventor: Akira Tomioka, Tokyo (JP)

(73) Assignee: Tomy Company, Ltd., Tokyo (JP)

( * ) Notice: Subject to any disclaimer, the term of this patent is extended or adjusted under 35 U.S.C. 154(b) by 91 days.

(21) Appl. No.: 09/758,158

(22) Filed: Jan. 12, 2001

(65) Prior Publication Data

US 2001/0010315 A1 Aug. 2, 2001

(30) Foreign Application Priority Data

Jan. 27, 2000 (JP) ........................................ 2000-19298

(51) Int. Cl.$^{7}$ ................................................ B65G 59/00
(52) U.S. Cl. ....................................... 221/130; 312/101
(58) Field of Search ................................ 312/101, 102, 312/305; 221/130, 155, 281, 203, 265, 97–99; 193/DIG. 1

(56) References Cited

U.S. PATENT DOCUMENTS

| | | | | |
|---|---|---|---|---|
| 782,430 A | * | 2/1905 | Tone | 221/155 |
| 1,248,682 A | * | 12/1917 | Lauterbur | 312/305 |
| 1,284,319 A | * | 11/1918 | Grover | 221/281 |
| 3,010,556 A | * | 11/1961 | Wawrzonek et al. | 221/281 |
| 4,146,280 A | * | 3/1979 | Crownhart | 312/305 |
| 4,363,392 A | * | 12/1982 | McDonald | 221/281 |
| 4,530,549 A | | 7/1985 | Genna | |
| 4,679,684 A | * | 7/1987 | Glaser | 221/130 |
| 4,871,086 A | | 10/1989 | Davies et al. | |
| 5,027,974 A | * | 7/1991 | Porter et al. | 221/196 |
| 5,247,798 A | * | 9/1993 | Collard, Jr. | 221/266 |
| 5,361,937 A | | 11/1994 | Wiese | |
| 5,452,822 A | * | 9/1995 | Haymond | 221/155 |
| 5,715,925 A | | 2/1998 | Tomioka | |
| 5,785,378 A | | 7/1998 | Seefried et al. | |
| 6,182,859 B1 | * | 2/2001 | Bolen | 221/152 |

FOREIGN PATENT DOCUMENTS

| | | |
|---|---|---|
| JP | 54-99499 | 8/1976 |
| JP | 62-34296 | 2/1987 |
| JP | 8-212438 | 8/1996 |
| JP | 3267512 | 1/2002 |
| WO | WO 95/13001 A | 5/1995 |

* cited by examiner

*Primary Examiner*—Kenneth W. Noland
(74) *Attorney, Agent, or Firm*—Staas & Halsey LLP

(57) ABSTRACT

An article discharging device having a main body (1) with an opening (1*a*) which is provided in a front side, comprising: a container (2) for containing and holding an article therein, which comprises a front wall (2*b*) at least a portion of which is transparent and an article entrance (8) formed in an upper side, wherein the container (2) is able to close the opening and the article held in the container can be viewed through the transparent portion of the front wall in a closed state, and the container can be rotated reciprocally around a predetermined axis (2*a*), to take the closed state or an article entrance exposed state.

10 Claims, 10 Drawing Sheets

ARTICLE DISCHARGING DEVICE

BACKGROUND OF THE INVENTION

1. Field of the Invention

The present invention relates to an article discharging device, in particular, a premium supplying device, an automatic vending machine or the like.

2. Description of Earlier Development

Conventionally, an automatic vending machine in the body of which commodities put in plastic capsules (hereinafter referred to as capsule commodities) are contained and a capsule commodity can be discharged by inserting a predetermined coin into a coin put-in slot and turning a handle, has been known.

In such an automatic vending machine, a door made of transparent material which can get up or fall down is provided at an opening formed in the body. The capsule commodities in the vending machine can be recognized visually through the transparent door. Supplement of the capsule commodities in the vending machine was carried out by bringing the door down forward and by adding capsule commodities in the vending machine. Exchange of the capsule commodities contained in the vending machine to another type was also carried out by bringing the door down forward and by exchanging the commodities.

However, the earlier developed automatic vending machine having such a structure has the following problems.

Because the door is brought down forward when supplement or exchange of the capsule commodities in the vending machine is carried out, in particular, during exchanging, the capsule commodities contained in the vending machine often drop. When taking capsule commodities out of the back part of the vending machine, it is required to make an arm stretch to its full length because the door is brought down forward.

Such problems occur in not only vending machines but also gift supplying devices provided by game apparatuses or the like.

SUMMARY OF THE INVENTION

The present invention has been made for solving such problems.

An object of the present invention is to provide an article discharging device convenient for use.

That is, in accordance with an aspect of the invention, the article discharging device having a main body with an opening which is provided in a front side, comprises:

a container for containing and holding an article therein, which comprises a front wall at least a portion of which is transparent and an article entrance formed in an upper side, wherein the container is able to close the opening and the article held in the container can be viewed through the transparent portion of the front wall in a closed state, and the container can be rotated reciprocally around a predetermined axis, to take the closed state or an article entrance exposed state.

The term "a predetermined axis" may be, for example, an axis extending in a vertical direction or an axis extending in a horizontal direction.

According to the article discharging device, the article entrance can be exposed by rotating the container around the predetermined axis, and thereby it is possible to fill up articles through the exposed article entrance.

Preferably, the front wall of the container has a shape expanded outwardly and the container can be rotated reciprocally around an axis extending from a side of the main body to the other side.

According to the article discharging device having such a structure, when the container is rotated around the axis to take the article entrance exposed state, the articles stored in the container can be surely held by the front wall of the container having the shape expanded outwardly.

Preferably, the article discharging device is an automatic vending machine to discharge an article by putting a coin in and can be used by piling up a plurality of main bodies, and a coin storage portion is provided at a lower position of a lower main body, to be able to store not only a coin from the lower main body but also a coin from an upper main body.

According to the article discharging device having such a structure, it is possible to take the coins out of only one bottom portion. Therefore, it is not only convenient but also advantageous in production cost because it is not required to provide a coin storage portion in every main body.

In the article discharging device, each of the main bodies may be provided with a first coin guide member near a coin insert, for transferring a put-in coin from the coin insert downward and at least a lower main body is also provided with a second coin guide member on a top portion thereof, which is connectable to an end of the first coin guide member of an upper main body, for transferring a coin put in the upper main body toward a lower portion of the lower main body.

In accordance with another aspect of the invention, the article discharging device having a main body with an opening which is provided in a front side, comprises:

a container for containing and holding an article therein, which comprises a front wall at least a portion of which is transparent and an article entrance formed in an upper side, wherein the container is able to close the opening and the article held in the container can be viewed through the transparent portion of the front wall in a closed state, and the container can be rotated reciprocally around a lateral axis which extends from a side of the main body to the other side through a predetermined point inside the main body, to take the closed state or an article entrance exposed state.

In the article discharging device, preferably, the front wall of the container has a shape like a portion of a periphery of a cylinder having a lateral central axis or a sphere, having a lateral central axis which extends from a side of the main body to the other side through a predetermined point inside the main body, and the container can be reciprocally rotated approximately around the lateral central axis.

In the article discharging device, the container may have a shape like a cylinder having the lateral central axis and an opening formed in an upper side thereof as the article entrance.

The front wall of the container may have a shape like a portion of a sphere and the container can be reciprocally rotated approximately around the lateral central axis of the sphere.

The container may have a shape like the sphere having the lateral central axis and an opening formed in an upper side thereof as the article entrance.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinbelow, an embodiment will be described with reference to the drawings.

Figure 1:
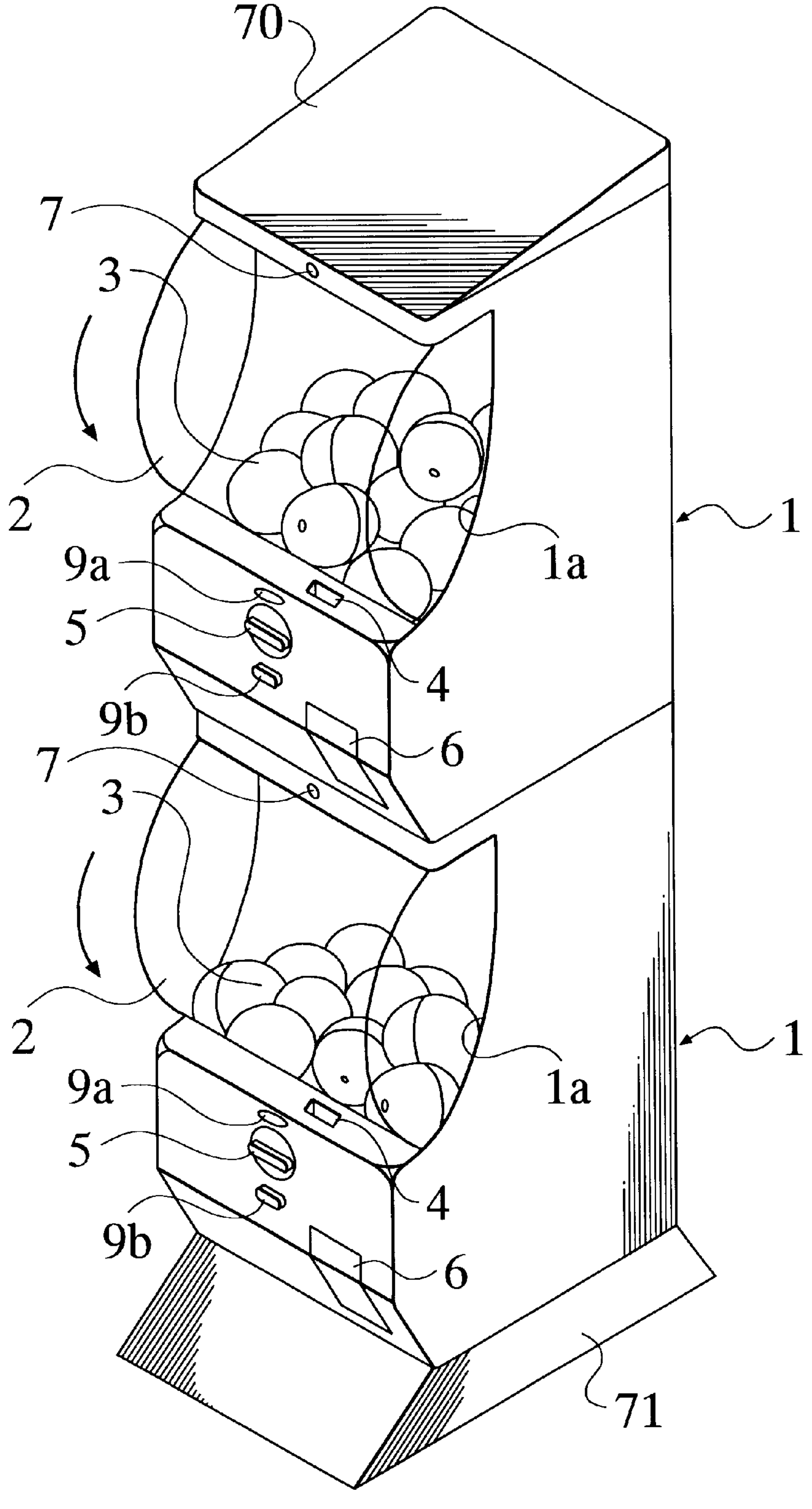
FIG. 1 is a perspective view showing an automatic vending machines of an embodiment of the invention.

FIG. 1 is a perspective view of an automatic vending machine, i.e., a commodity (article) discharging device, having double-layered main bodies. In the figure, the reference numerals 1 and 1 denote main bodies of the automatic vending machine. In the front side of each main body 1 of the automatic vending machine, an opening 1*a* is formed, and a container 2 for containing and holding a large number of capsule commodities 3 therein is provided to fit in the opening 1*a*.

In each main body 1 of the automatic vending machine, when putting a predetermined type of coin into a coin insert 4 and then giving a handle 5 one rotation in the clockwise direction, one capsule commodity 3 is discharged to a commodity discharge 6.

In order to fill up capsule commodities 3 into the main body 1 or to exchange the capsule commodities 3 which are already contained in the main body for another type of capsule commodities, a key 90 (shown in FIG. 2) is inserted into a key hole of a cylinder 7 which is provided at an upper portion of the main body 1 of the automatic vending machine and then rotated in a predetermined direction. Accordingly, the lock is disconnected to make the container 2 rotatable. When rotating the container 2 around the lateral axis (horizontal axis) 2*a* in the direction of the arrow shown in FIG. 2, like falling forward, a commodity entrance 8 which is formed in an upper side of the container 2 is exposed. In this state, it is possible to fill up capsule commodities 3 into the main body 1 or to exchange the capsule commodities 3 for another type of capsule commodities, through the exposed commodity entrance 8 of the container 2.

In the main body 1 of the automatic vending machine, a coin or the like which was put in the main body 1 by mistake is given back to a coin return 9*b* by pushing down a coin return lever 9*a*.

Next, the structure of the main body 1 of the automatic vending machine will be explained in detail.

Figure 2:
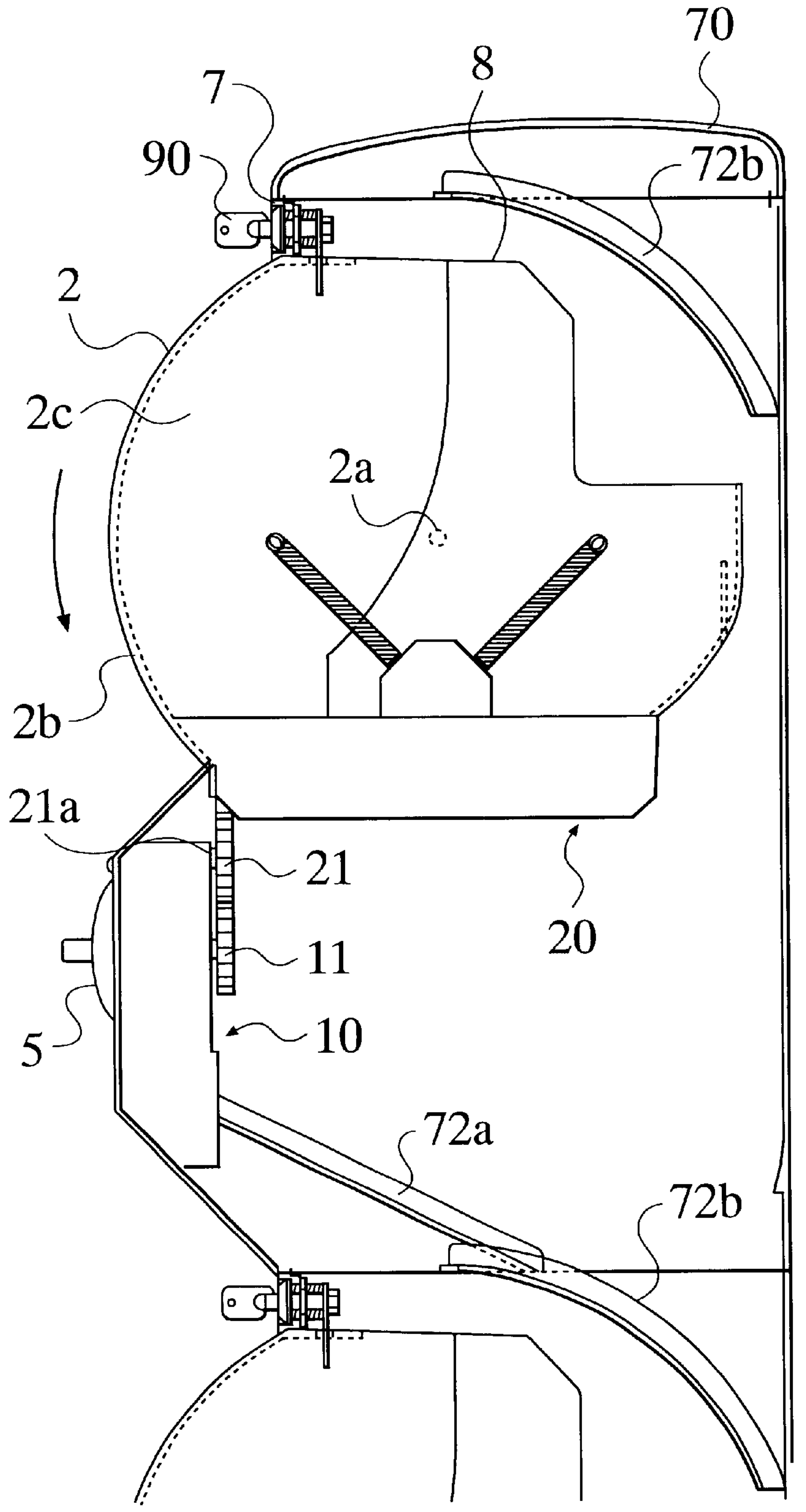
FIG. 2 is a cross-sectional view of an approximate upper half of the automatic vending machine shown in FIG. 1, when seen from a side.

The main body 1 of the automatic vending machine comprises the container 2, a coin sorting device 10, and a commodity discharging member 20, as shown in FIG. 2. The commodity discharging member 20 forms the bottom of the container 2.

The front wall 2*b* and the almost front half portions of the side walls 2*c* are made of light transmissive material. For example, a transparent plastic material is used for the portion. The front wall 2*b* of the container 2 has a curved shape which expands forward. An opening as a commodity entrance 8 of the container 2 is formed to extend from the forward upper end portion to the rear end portion. Although it is not limited, in this embodiment, the commodity entrance 8 is formed in Z-shape, i.e., in a step-shape, in a side sectional view of FIG. 2. Supplement of the capsule commodities 3 in the vending machine or exchange of the capsule commodities 3 to another type can be carried out by rotating the container 2 around the axis 2 in the direction shown in FIG. 3, to expose the opening of the commodity entrance 8. By further rotating the container 2 in the same direction than the state shown in FIG. 3, it is also possible to repair the coin sorting device 10 and the like by using the commodity entrance 8.

The whole shape of the container 2 maybe like an approximate cylinder or an approximate sphere. The container 2 can be rotated reciprocally around a lateral axis 2*a* which extends from a side of the main body 1 to the other side through a predetermined point inside the main body 1. Although the rotary axis of the container 2 and the central axis thereof are consistent with each other in the embodiment, they may not be consistent.

The coin sorting device 10 judges whether the put-in coin is true or false and whether a predetermined number of coins are put in. That is, the coin sorting device 10 permits the handle 5 to rotate only when the predetermined number of normal coins were put in. In the coin sorting device 10, when rotating the handle 5, the gear 11 provided in the rear side rotates together with the rotation of the handle.

Figure 3:
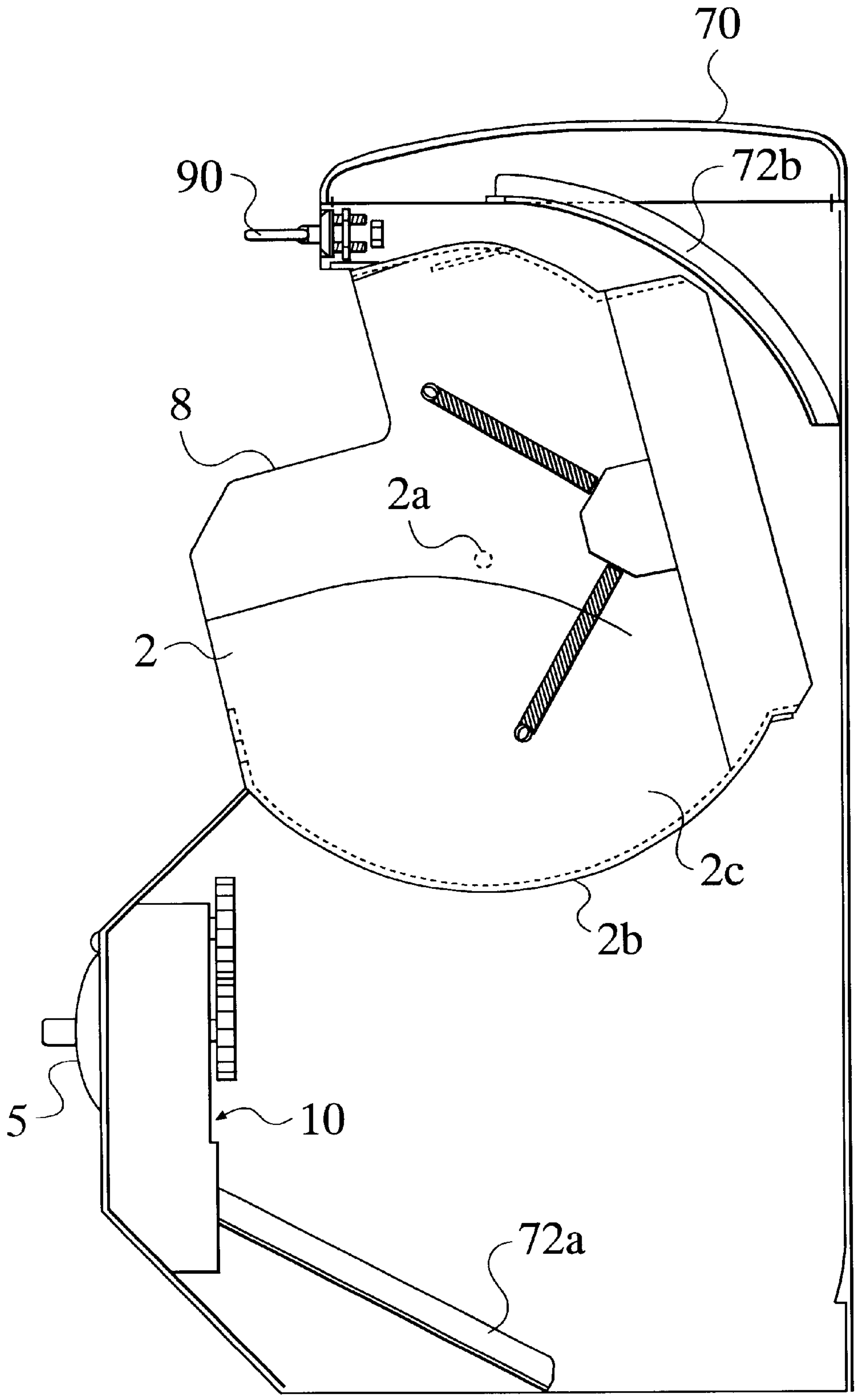
FIG. 3 is a cross-sectional view of the container in a state of the commodity entrance exposed, in the approximate upper half of the automatic vending machine shown in FIG. 2, when seen from a side.
Figure 4:
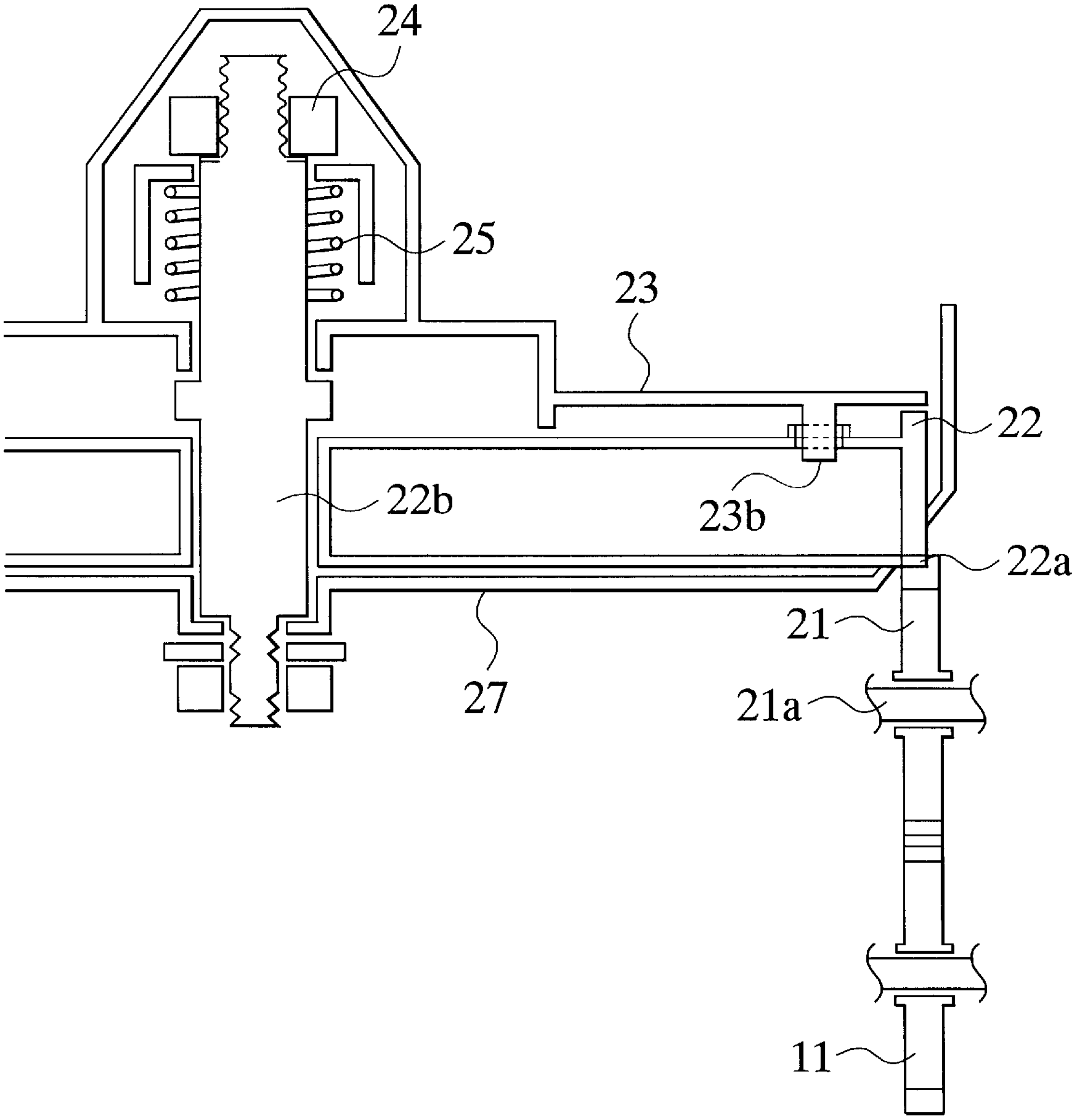
FIG. 4 is a view for showing the commodity discharging mechanism of the automatic vending machine shown in FIG. 1.

On the other hand, the commodity discharging member 20 is for discharging a capsule commodity 3 with rotation of the handle 5. That is, The gear 11 is engaged with the gear 21 which is attached to the shaft 21*a*, as shown in FIG. 2. The gear 21 is engaged with a rack gear 22*a* which is attached to a drum 22, as shown in FIG. 4. Accordingly, when the handle 5 is turned, the drum 22 is rotated with respect to a shaft 22*a* via the gears 11 and 21 and the rack gear 22*a*. Engagement of the gears 11 and the rack gear 22*a* can be released by rotation of the container 2 around the lateral axis 2*a*, as shown in FIG. 3.

Figure 5:
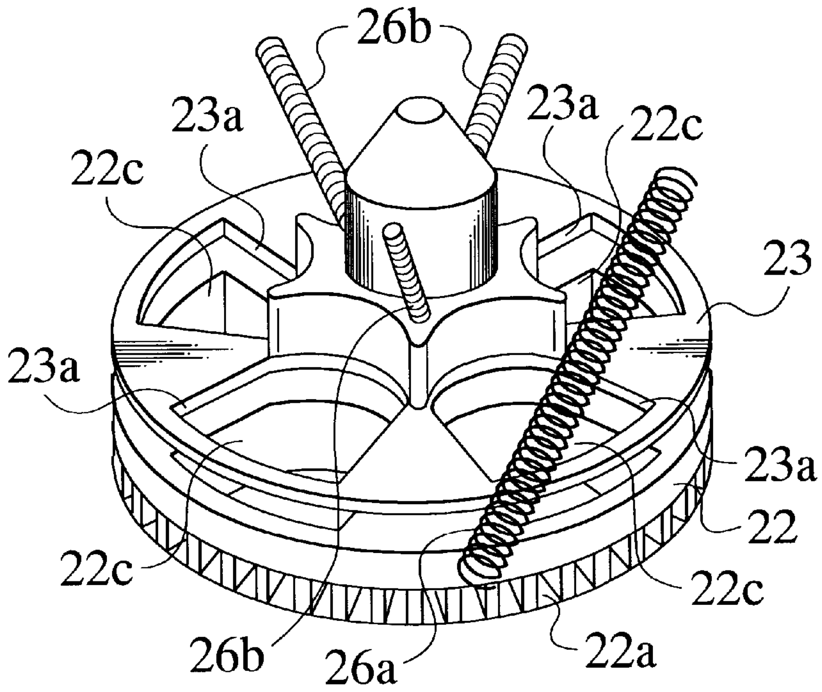
FIG. 5 is a perspective view of a rotary drum and an opening regulating plate of the automatic vending machine of the embodiment.
Figure 6:
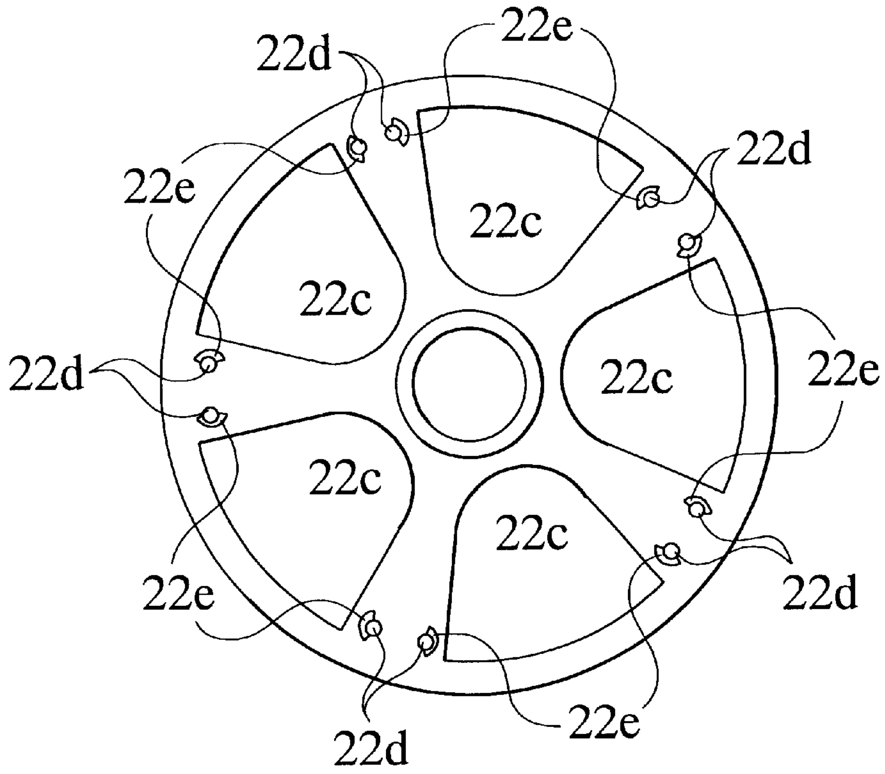
FIG. 6 is a plan view of the rotary drum of the automatic vending machine shown in FIG. 1.
Figure 7:
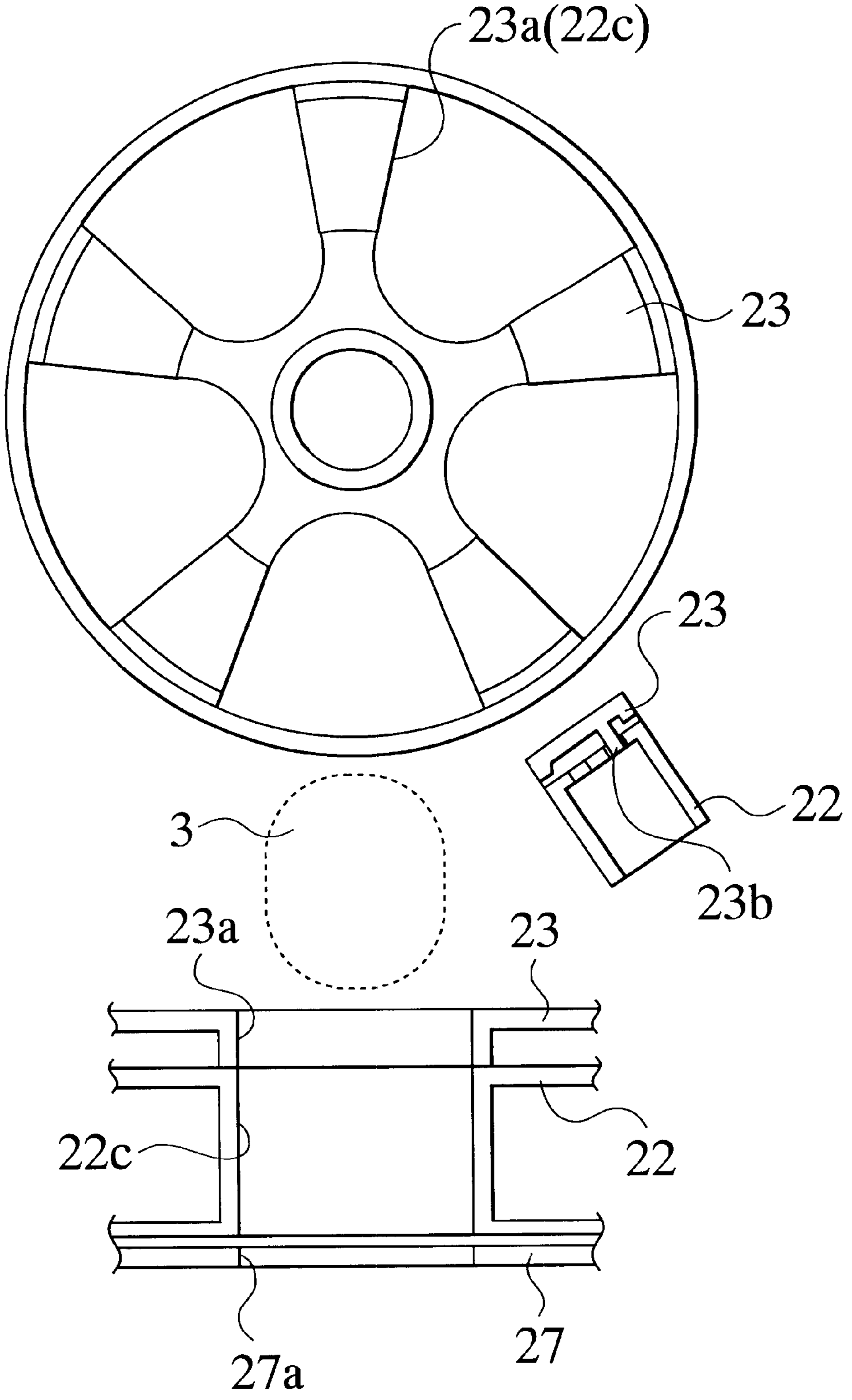
FIG. 7 is a view for showing a rotary drum and an opening regulating plate of the automatic vending machine shown in FIG. 1.
Figure 8:
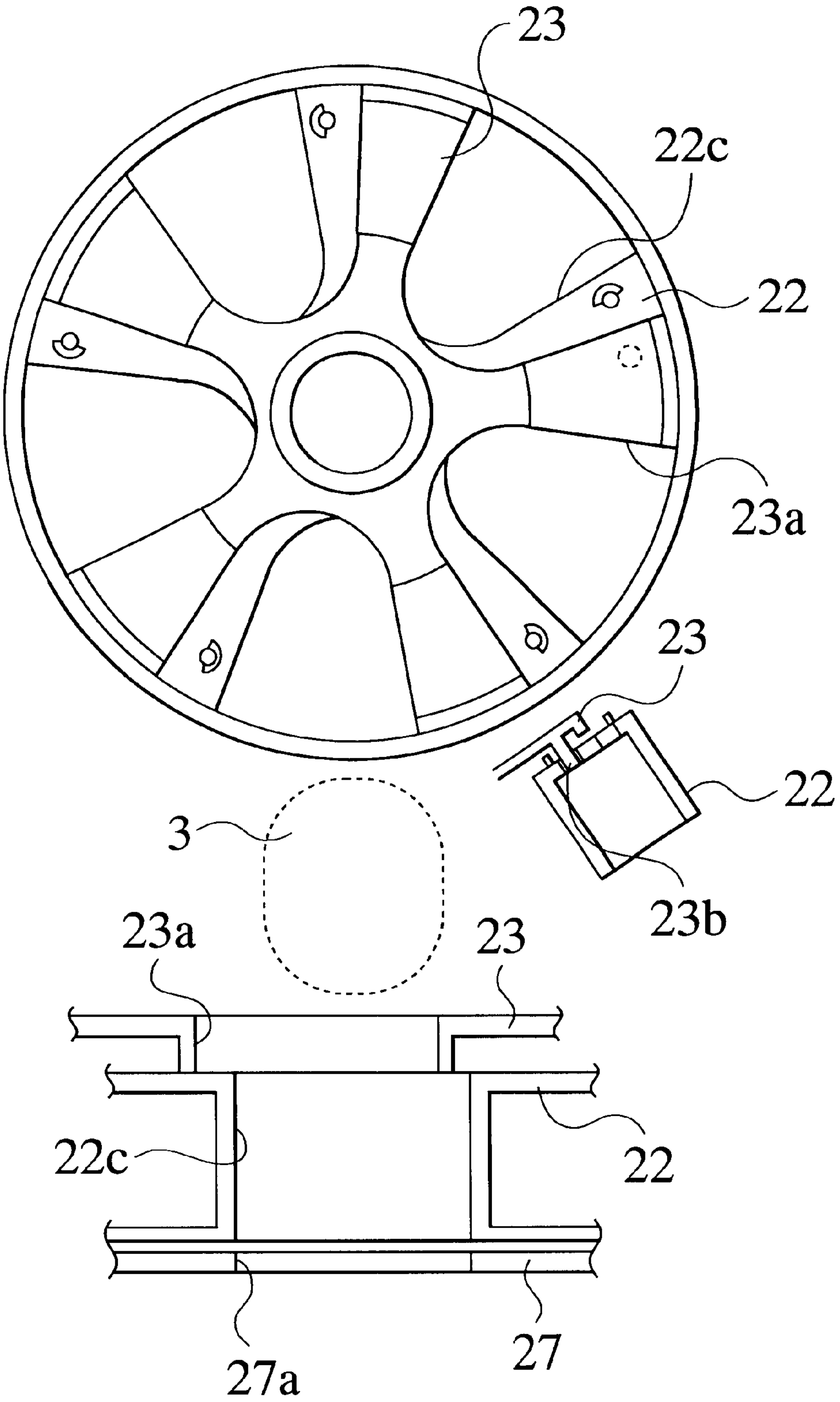
FIG. 8 is a view for showing a rotary drum and an opening regulating plate of the automatic vending machine shown in FIG. 1.

As shown in FIG. 5, the drum 22 is provided with a plurality of hanging bell-shaped commodity discharging openings 22*c*. When one rotation is given to the handle 5, the drum 22 is rotated by a pitch of opening. Further, on the drum 22, an opening regulating plate 23 is provided with openings 23*a* having almost the same shape as the hanging bell-shaped commodity discharging openings 22*c* and arranged at the same pitch. As shown in FIG. 4, the opening regulating plate 23 is pressed against the drum 22 due to a spring 25 disposed between a nut 24 screwed onto an upper end portion of the shaft 22*b* and itself. Further, in the lower surface of the opening regulating plate 23, one boss (positioning projection) 23*b* is provided between the adjacent openings 23*a* and 23*a* of each pair, as shown in FIG. 4. On the other hand, as shown in FIG. 6, the drum 22 is provided with two fitting holes (positioning holes) 22*d* between the adjacent commodity discharging openings 22*c* and 22*c* of each pair for selectively fitting over the foregoing boss 23*b*. By pulling out the bosses 23*b* from the fitting holes 22*d* in the state where the opening regulating plate 23 is separated from the drum 22 against the biasing force of the spring 25, the opening regulating plate 23 is allowed to rotate relative to the drum 22. Further, as shown in FIG. 6, at the edge portions of the fitting holes 22*d,* semicylindrical stoppers 22*e* are provided, respectively. Accordingly, when the opening regulating plate 23 is rotated in the clockwise or counterclockwise direction, the bosses 23*b* abut the stoppers 22*e,* respectively. Thus, if released from a hand in that state, the bosses 22*e* are surely fitted into the fitting holes 22*d* due to the biasing force of the spring 25. In this case, if the boss 23*b* is fitted into one of the fitting holes 22*d* between the adjacent commodity discharging openings 22*c* and 22*c* of each pair, as shown in FIG. 7, since the commodity discharging openings 22*c* of the drum 22 and the openings 23*a* of the opening regulating plate 23 are matched, it is possible to discharge a large capsule commodity 3. On the other hand, if the boss 23*b* is fitted into the other of the fitting holes 22*d* between the adjacent commodity discharging openings 22*c* and 22*c* of each pair, as shown in FIG. 8, since the commodity discharging openings 22*c* of the drum 22 and the openings 23*a* of the opening regulating plate 23 are not matched, a portion of each commodity discharging opening 22*c* is closed by the opening regulating plate 23 so that only a small capsule commodity 3 can be discharged. In this manner, effective opening areas of the commodity discharging openings 22*c* can be easily changed depending on a size of the capsule commodity 3 to be sold. Here, the effective opening areas of the commodity discharging openings 22*c* are changed in two steps. On the other hand, it may also be arranged that the effective opening areas of the commodity discharging openings 22*c* are changed in three or more steps.

Under the drum 22, as shown in FIGS. 4, 7 and 8, a fixed cover 27 with a commodity drop opening 27*a* formed therein is provided. The capsule commodity 3 caught at the commodity discharging opening 22*c* is discharged when it comes to the position the commodity drop opening 27*a* of the fixed cover 27.

Further, in this embodiment, the opening regulating plate 23 is provided with a rod-like spring 26*a* so as to ensure falling of the filled capsule commodity 3 into the commodity discharging opening 22*a,* as shown in FIG. 5. Because the rod-like spring 26*a* is positioned above the commodity drop opening 27*a,* the capsule commodities 3 can be discharged one by one through the commodity drop opening 27*a*. At the central positions of the opening regulating plate 23, rod-like springs 26*b* for stirring the capsule commodities 3 are attached.

Figure 9:
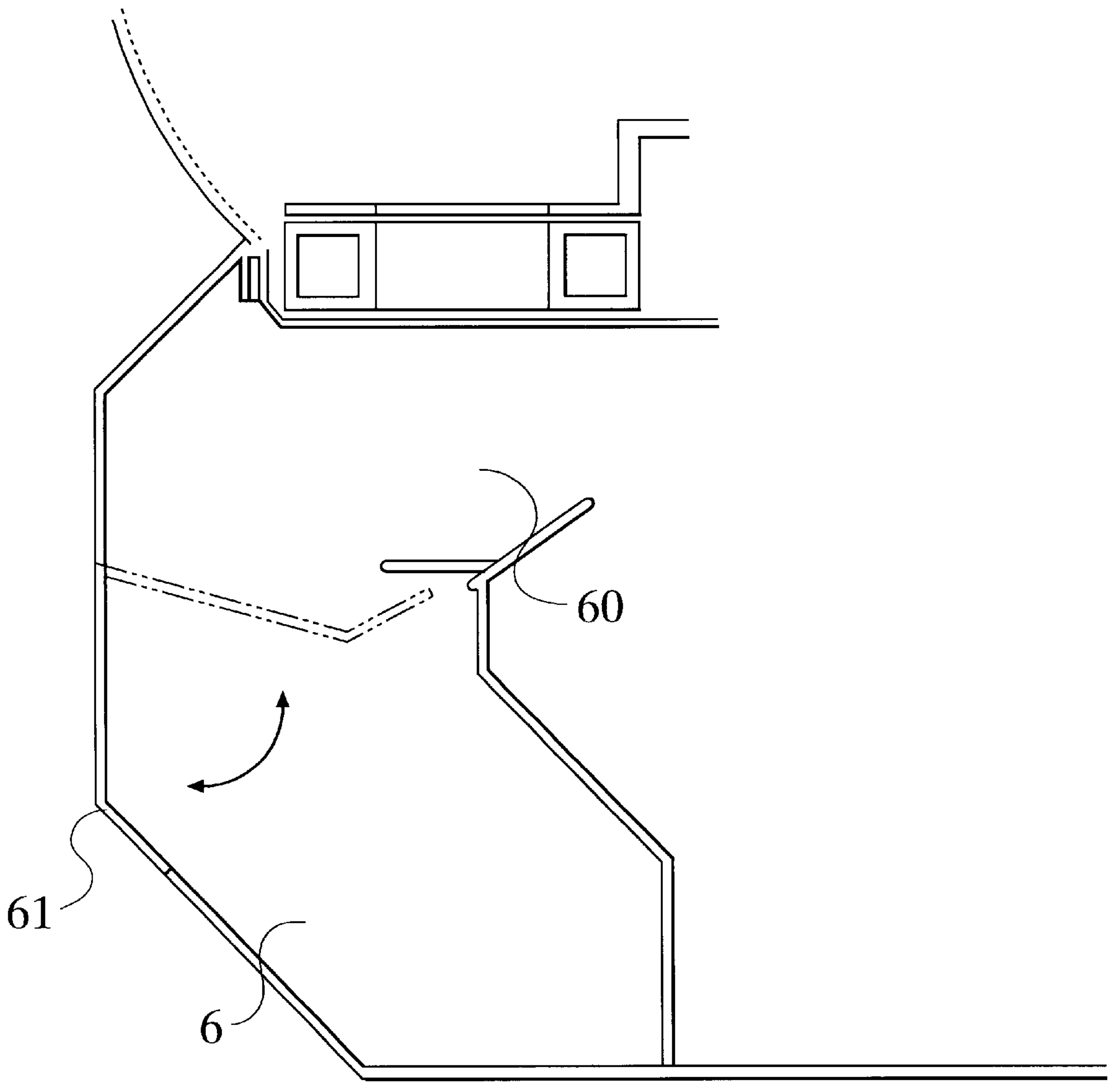
FIG. 9 is a view for showing a commodity discharge and the like, of the automatic vending machine shown in FIG. 1.

As shown in FIG. 9, in the commodity discharge 6, a door 61 is provided so that it can be pushed toward a commodity discharging passage 60.

Each of the upper and lower main bodies 1 and 1 of the automatic vending machine has almost the same structure. Although either of the main bodies 1 and 1 may be at an upper position or a lower position, the upper main body 1 of the automatic vending machine is provided with a top board 70 on the top thereof, as shown in FIGS. 1 to 3. The lower main body 1 is provided with a coin storage portion 71 at the bottom thereof, as shown in FIGS. 1 and 10.

Each of the main bodies 1 is provided with a first coin guide member 72*a* near a coin insert 4, for transferring a put-in coin from the coin insert 4 downward and at least a lower main body 1 is also provided with a second coin guide member 72*b* on a top portion thereof, which is connectable to an end of the first coin guide member 72*a* of an upper main body 1, for transferring a coin put in the upper main body toward a lower portion of the lower main body through the first and second coin guide members 72*a* and 72*b*. The coins which were put not only into the lower main body but also into the upper main body are dropped to the coin storage portion 71 at the bottom of the lower main body, by passing through the rear side of the container 2, that is, through a coin guide member 72 which is provided in the lower main body 1. The coins stored in the coin storage portion 71 can be taken out by opening a door which is not shown in the figures. As described above, when piling up a plurality of main bodies 1 and 1, it is possible to facilitate collection of coins by using the base or bottom portion of the lowest main body 1 as the coin storage portion 71. In the above embodiment, although coins are dropped to the coin storage portion 71 by passing through the rear side of the container 2, the coins may be also dropped to the coin storage portion 71 by passing through the lateral side the container 2. Such a technical idea can be applied not only for the automatic vending machine of the present invention but also for every type of article discharging device which exists at present time or may exist in the future.

Conventionally, the article discharging device, e.g., automatic vending machines and the like, had a coin storage portion every main body. In such a conventional article discharging device having a plurality of piled-up main bodies, because a coin storage portion was provided in each main body, much time was required for taking coins out of all coin storage portions. According to the article discharging device having a plurality of piled-up, e.g., double layered, main bodies, of the embodiment, because the coin storage portion is provided at the bottom portion of the lower main body and thus all coins which were put into the upper main body can be collected in the coin storage portion of the lower main body, it is possible to take all coins out of only one coin storage portion conveniently. Since the coin storage portion is not required for every piled-up main bodies of the article discharging device, it is also possible to reduce the production costs thereof. In this case, it is preferable that the upper and lower main bodies have almost the same structure and the coin storage portion is provided detachably in the lower side of the lower main body of the article discharging device.

Figure 10:
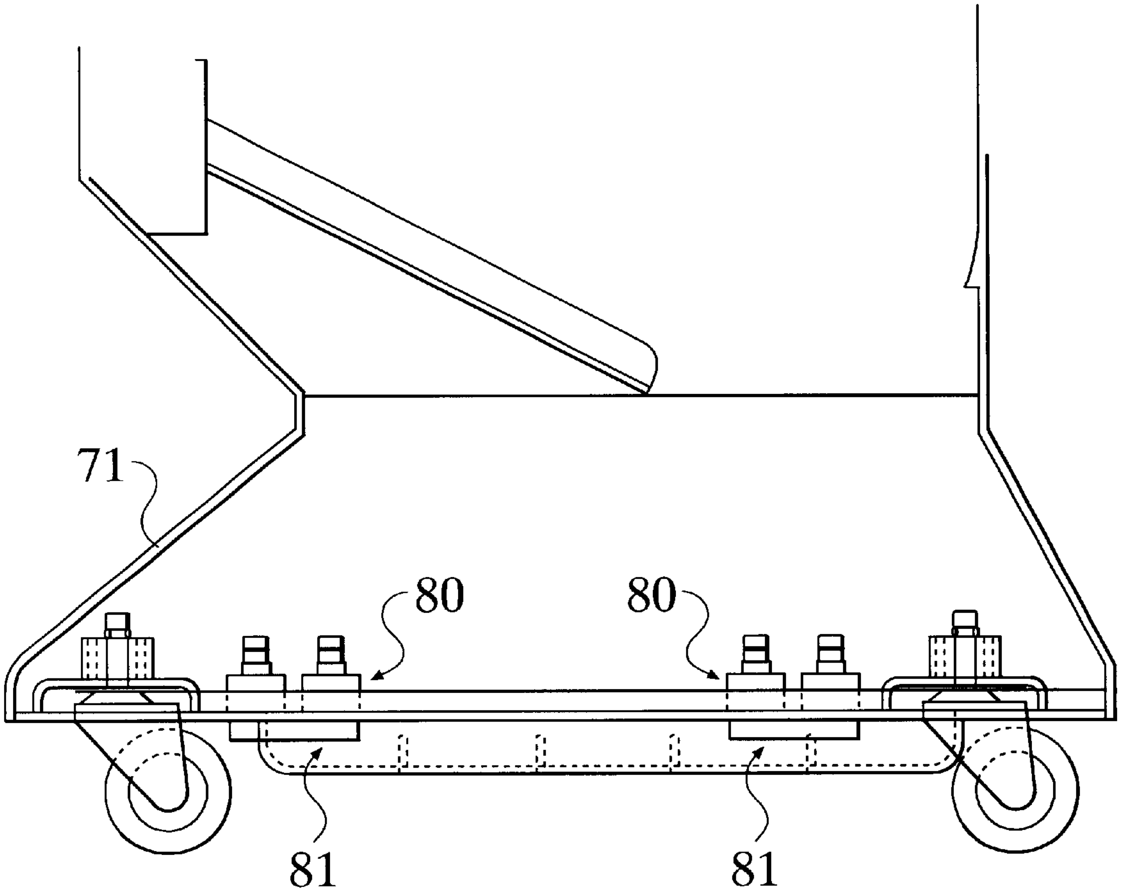
FIG. 10 is a view for showing a coin storage portion of the automatic vending machine shown in FIG. 1.
Figure 11:
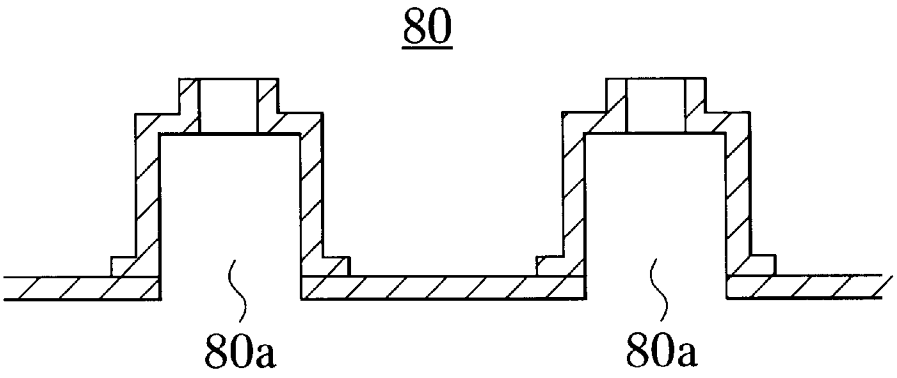
FIG. 11 is a view for showing a connecting portion of the automatic vending machine shown in FIG. 1.

Further, in the main body 1 of the automatic vending machine, a plurality of connecting portions 80 and 80 are provided at a lower side of the coin storage portion 71, as shown in FIG. 10. In each connecting portion 80, two insertion holes 80*a* and 80*a* are formed in parallel, as shown in the enlarged view of FIG. 11. Adjacent two automatic vending machines can be connected with each other by using the two insertion holes 80*a* and 80*a*.

Figure 12:
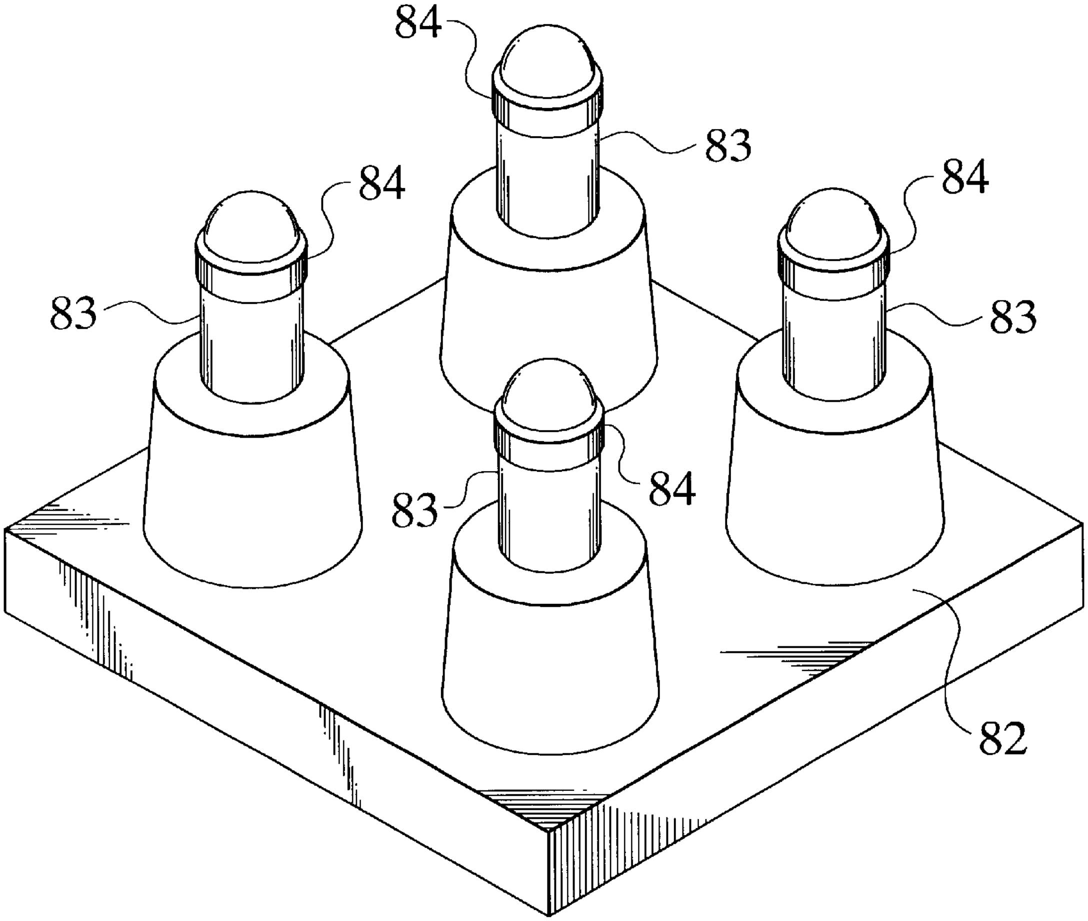
FIG. 12 is a view for showing a connecting member of the automatic vending machine shown in FIG. 1.

FIG. 12 shows an embodiment of the connecting member 81 which comprises a base plate 82 and four connecting plugs 83 which are attached to erect on the base plate 82. Each connecting plugs 83 comprises a narrow portion near the head thereof and a rubber ring 84 wound around the narrow portion. Two of four connecting plugs 83 are inserted into two insertion holes 80*a* of an automatic vending machine and the rest two connecting plugs 83 are inserted into two insertion holes 80*a* of another adjacent automatic vending machine. In the inserted state, each rubber ring 84 is engaged with the end portion of the insertion hole 80*a*. In such a structure, after placing the two automatic vending machines side by side and putting together the heads of four connecting plugs 83 and the corresponding four insertion holes 80*a,* when the lower surface of the base plate 82 is hit upward by a hammer or the like, the adjacent automatic vending machines can be connected to each other easily. On the other hand, the release of connection of the adjacent automatic vending machines can be carried out by inserting a driver or the like between the lower plate of the coin storage portion 71 and the base plate 82 and by wrenching the driver or the like.

In the foregoing, explanation has been made to the embodiment achieved by the present inventors. However, it is needless to say that the present invention is not limited to such an embodiment, but various modifications can be made in a range not changing the gist thereof.

According to the article discharging device, the article entrance can be exposed by rotating the container around the predetermined axis, and thereby it is possible to fill up or exchange articles easily through the exposed article entrance. By expanding the shape of the front wall of the container outwardly, it is possible to hold many articles in the container surely even while the article entrance is exposed. When the coin storage portion is provided at the bottom portion of the lower main body and thus all coins which were put into the upper main body can be collected in the coin storage portion of the lower main body, it is possible to take all coins out of only one coin storage portion conveniently, and to reduce the production costs thereof.

The entire disclosure of Japanese Patent Application No. Tokugan 2000-19298 filed on Jan. 27, 2000 including specification, claims, drawings and summary are incorporated herein by reference in its entirety. Further, the entire disclosure of the U.S. Pat. No. 5,715,925 by the same inventor, including specification, claims, drawings and summary are incorporated herein by reference in its entirety. In particular, the technique disclosed in the U.S. Pat. No. 5,715,925, for example, a coin sorting mechanism, a coin return mechanism, a false coin capturing mechanism, a coin passage regulating mechanism and the like, can be applied for the article discharging device according to the invention.

What is claimed is:

1. An article discharging device having a main body with an opening which is provided in a front side, comprising:

a container having an approximately cylindrical or spherical shape, to contain and hold a plurality of articles therein, the container comprising:

a front wall having a transparent portion, and an upper side having an article entrance formed therein;

wherein the container is able to close the opening and the articles held in the container can be viewed through the transparent portion of the front wall in a closed state, and the container can be rotated reciprocally around an approximately horizontal axis, to allow the article entrance to be exposed to receive the articles into the container through the exposed article entrance.

2. The article discharging device as claimed in claim 1, wherein the front wall of the container has a shape expanded outwardly and the container can be rotated reciprocally around an axis extending from a side of the main body to the other side.

3. An automatic vending machine to discharge an article by inserting a coin, the vending machine comprising:

a plurality of main bodies stacked on each other, each of the main bodies having an opening which is provided in a front side thereof and comprising:

a container to contain and hold an article therein, the container comprising a front wall having a transparent portion and an upper side having an article entrance formed therein, wherein the container is able to close the opening and the article held in the container can be viewed through the transparent portion of the front wall in a closed state, and the container can be rotated reciprocally around a predetermined axis, to take the closed state or an article entrance exposed state; and a coin storage portion which is provided at a lower position of a lower one of the main bodies, to store not only one of the coins from the lower main body but also one of the coins from an upper one of the main bodies.

4. The article discharging device as claimed in claim 3, wherein the predetermined axis is a lateral axis which extends from a first side of the main body to a second side of the main body through a predetermined point inside the main body, to take the closed state or an article entrance exposed state.

5. The article discharging device as claimed in claim 4, wherein the front wall of the container has a shape like a portion of a periphery of a cylinder having a lateral central axis or a sphere, having a lateral central axis which extends from a side of the main body to the other side through a predetermined point inside the main body, and the container can be reciprocally rotated approximately around the lateral central axis.

6. The article discharging device as claimed in claim 5, wherein the container has a shape like a cylinder having the lateral central axis and an opening formed in an upper side thereof as the article entrance.

7. The article discharging device as claimed in claim 5, wherein the front wall of the container has a shape like a portion of a sphere and the container can be reciprocally rotated approximately around the lateral central axis of the sphere.

8. The article discharging device as claimed in claim 7, wherein the container has a shape like the sphere having the lateral central axis and an opening formed in an upper side thereof as the article entrance.

9. The article discharging device as claimed in claim 3, wherein each of the main bodies is provided with a first coin guide member near a coin insert, for transferring a put-in coin from the coin insert downward and at least a lower main body is also provided with a second coin guide member on a top portion thereof, which is connectable to an end of the first coin guide member of an upper main body, for transferring a coin put in the upper main body toward a lower portion of the lower main body.

10. The article discharging device as claimed in claim 3, wherein the front wall of the container has a shape expanded outwardly and the container can be rotated reciprocally around the predetermined axis extending from a first side of the main body to a second side of the main body side.

* * * * *